United States Patent Office
3,258,493
Patented June 28, 1966

3,258,493
α,α'-BIS(LAURYLTHIO)-p-XYLENE
Harry Braus, Springdale, and Fred D. Waas, Cincinnati, Ohio, assignors to National Distillers and Chemical Corporation, New York, N.Y., a corporation of Virginia
No Drawing. Filed Sept. 11, 1962, Ser. No. 222,929
1 Claim. (Cl. 260—609)

This invention relates to new compositions of matter and particularly to new compositions of matter comprising polymers of aliphatic olefins stabilized against molecular degradation using α,α'-bis(alkylthio)xylenes and the process therefor.

Polymers of aliphatic olefins, such as for example, polypropylene, have numerous valuable properties which permit them to be used in the manufacture of pipe, film, wire, coating or various molded objects such as bottles and the like. These polymers have high tensile strength, are not subject to stress cracking, and display very little creep under load. It has been observed, however, that such polymers under conditions of elevated temperature and/or mechanical working, particularly in the presence of oxygen, undergo molecular degradation resulting in a deterioration of physical properties. Adequate stabilization of such polymers is of utmost importance in order to protect the polymer during fabrication and use. The molecular breakdown which occurs in these polymers during fabrication is usually evidenced by a substantial increase in the melt flow rate and in the color of the polymer.

It is an object of this invention to provide a method of stabilizing polymers of aliphatic olefins against both thermal and mechanical degradation. Another object is to provide a stabilized polymer of an aliphatic olefin which can be processed under conditions of elevated temperature and mechanical working without substantial increase in the melt flow rate, and without important color change. Still another object is to provide compositions comprising as a major component, polymers of aliphatic olefins, and as a minor component α,α'-bis(alkylthio)xylenes, alone, or together with other known stabilizers for polymers of aliphatic olefins. Other objects will appear hereinafter.

It has been discovered that polymers of aliphatic olefins, especially those having 2 to 8 carbon atoms per molecule, can be stabilized against degradation by incorporating into the polymer α,α'-bis(alkylthio)xylene compounds having the following structure:

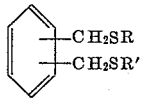

wherein R and R' are alkyl radicals having from about 10 to 22 carbon atoms.

The polymers to which this invention applies are the normally solid polymers of aliphatic olefins having from 2 to 8 carbon atoms per molecule such as polymers of ethylene, propylene, 1-butene, isobutylene, 2-butene, 1-pentene and 1-hexene and copolymers thereof.

These compounds may be mixed with the polyolefin polymer in any suitable manner that will effect thorough distribution and dispersion. This can be accomplished in a machine suitable for mixing solids, as by milling the polyolefin with the additive on heated rolls, such as are used in the compounding of rubber, or on other suitable milling or mixing equipment, such as for example, a Banbury mixer or conventional rubber mill. Instead of adding the stabilizing agent to the polymer in the solid or molten state, it can be added to a solution or suspension of polymer in an organic solvent or to an aqueous dispersion thereof and the volatile solvent subsequently removed by vaporization.

In general, the amount of agent to be added to the polyolefin polymer depends upon the degree and kind of stabilization desired. The amount of agent added can vary from 0.001% to 5.0% based on the weight of the polyolefin, but as a rule it is preferred to use the minimum amount required to achieve the desired results. The preferred amount of additive used will ordinarily vary from 0.05 to 0.5 part by weight per hundred parts of polyolefin.

The above defined compounds may be used in combinations with other stabilizers, and in particular those of the hindered bis-phenol type which is a derivative of 2,2'-dihydroxydiphenylmethane; alleged to be 2,2'-methylene-bis(4-methyl-6-tertiarybutyl-phenol). The novel stabilizers of this invention may also be used in combination with other stabilizers of the hindered bisphenol type such as 2,2'-methylene-bis(4-ethyl - 6 - tertiarybutyl-phenol); 4,4'-bis(2,6-di-tertiarybutyl-phenol); or 2,6 - ditertiarybutyl-α-methoxy-p-cresol.

There are certain practical commercial advantages that often accompany the use of such combinations of stabilizers, as distinguished from the use of a single stabilizer material or compound. For example, one of the stabilizers of the combination might be costly or difficult to acquire in commercial amounts while the other stabilizer of the combination might be relatively cheap and readily available. In such a situation it is desirable to be able to substitute the cheaper stabilizer for a portion of the more expensive stabilizer, and still be able to obtain good stabilization.

In a preferred embodiment of the invention R and R' in the above formula are alkyl radicals having from about 10 to 22 carbon atoms. These compounds may be prepared, for example, by the reaction of an ortho, meta or para dihalide such as the dichloride or the dibromide with a sodium alkyl mercaptide to form the corresponding α,α'-bis(alkylthio)xylene which has the following formula:

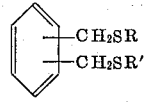

wherein R and R' are alkyl radicals having from about 10 to 22 carbon atoms. Accordingly R and R' may stand for capryl, lauryl, myristyl, palmityl, arachidyl and the like.

The following examples are presented to be illustrative only and are not intended in any way to limit the claim thereto.

Example 1

Into a dry three-necked 1000 ml. flask equipped with a water condenser, $CaCl_2$ tube, and stirrer was added 200 ml. of anhydrous ethanol and 11.5 g. of sodium. When solution was complete 101.2 g. of 1-dodecanethiol was added slowly. The reaction mixture was then maintained at below the boiling point and 43.6 g. of α,α'-dichloro-p-xylene in 300 ml. dry benzene added over a period of an hour. The solution was refluxed for an additional half hour. The reaction was then washed with hot water to remove alcohol and sodium chloride. The benzene was dried and evaporated leaving behind a white solid compound which is the α,α'-bis(laurylthio)-p-xylene. M.P., 57–59° C. Yield, 104.3 g. S: Calc., 12.64%; found, 12.25%.

In accordance with the above procedure, but using 1-decanethiol, 1-hexadecanethiol or 1-octadecanethiol in place of 1-dodecanethiol, the corresponding capryl, palmityl or stearyl derivative is obtained. Also, by starting with the corresponding ortho or meta xylenes, the ortho and meta derivatives can be made. Also mixtures of the xylene isomers can be used to make the corresponding mixtures of derivatives.

*Example II*

The thermal and oxidative breakdown were determined by measuring the change in flow rate (ASTM D–1238–57T, 2160 g. load; 190° C. for polyethylene and 230° C. for polypropylene), and by observing the color change upon extended milling at 350° F. The samples for testing are prepared in the following manner:

A sample of the polyolefin free of stabilizers and in the form of a 10 mesh powder, and the desired quantity of stabilizer as a 1% solution in benzene or acetone are charged to a Hobart mixer. The mixer is allowed to stir until all of the solvent has evaporated. A 400 gram aliquot of the resultant composition is then milled on a two-roll, differential speed, rubber mill at 350° F. Starting from the time at which all of the polymer has melted and banded, 30 gram samples of polymer are removed at 5, 10, 20, 30, 45 and 60 minute intervals.

Portions of each such sample are used for a determination of melt flow rate, and for the preparation of a pressed 1 inch by 1 inch by 50 mil sheet for mounting on white cardboard for color comparison.

Test results for $\alpha,\alpha'$-bis(laurylthio)-p-xylene in polypropylene as a stabilizer are given in Table I.

TABLE I

| Stabilizer | Concentration, wt. percent of polymer [1] | Milling Time, minutes at 330–340° F. | Melt Flow Rate | | Final Color |
|---|---|---|---|---|---|
| | | | Initial | Final | |
| None | 0 | 0 | 0.5 | | White, no haze. |
| | 0 | 10 | | 4.66 | |
| | 0 | 20 | | 15.6 | Gray. |
| $\alpha,\alpha'$-Bis(laurylthio)-p-xylene. | 0.5 | 60 | 0.5 | 3.36 | White, no haze. |

[1] Profax 6501 (unstabilized polypropylene).

In Table I the reference standard for determining improvement is the polymer blank without stabilizer. The sample stabilized with the $\alpha,\alpha'$-bis(laurylthio)-p-xylene exhibits significant improvement in both mill stability and color over the blank, when degraded for 60 minutes under the test conditions.

*Example III*

The $\alpha,\alpha'$-bis(laurylthio)-p-xylene was tested also in a linear polyethylene (density=0.945, melt index=0.59) for mill stability at 150° C. and for the change in the ratio of carbonyl oxygen to vinyl unsaturation during milling. The latter test is performed by removing a sample during milling, pressing it into a 4 in. x 4 in. x .005 in. sheet, and by infrared analysis determining the ratio of the optical density of the carbonyl groups to that of the methylene groups. This test is a sensitive measure of oxidative degeneration since such degradation is known to proceed by a gradual buildup of carbonyl oxygen.

Results of the tests are presented in Table II below.

TABLE II

| Stabilizer | Concentration, wt. percent of polymer | Milling Time, minutes at 150° C. | Melt Flow Rate | | Optical Density, $CO/CH_2$ | |
|---|---|---|---|---|---|---|
| | | | Initial | Final | Initial | Final |
| None | | 180 | 0.59 | 0.19 | 0.055 | 1.50 |
| $\alpha,\alpha'$-Bis(laurylthio)-p-xylene. | 0.1 | 180 | 0.61 | 0.63 | 0.041 | 0.081 |

The stabilizer compound is seen to definitely improve resistance to thermal and oxidative degradation in comparison with the unstabilized polymer.

As will be evident to those skilled in the art, various modifications of this invention can be made or followed in the light of the foregoing disclosure and discussion without departing from the spirit or scope thereof.

What is claimed is:

$\alpha,\alpha'$-Bis(laurylthio)-p-xylene.

References Cited by the Examiner

UNITED STATES PATENTS

| | | | |
|---|---|---|---|
| 2,872,433 | 2/1959 | Glickman | 260—45.7 |
| 2,983,706 | 5/1961 | Baldwin et al. | 260—45.7 |
| 3,096,375 | 7/1963 | Campbell | 260—609 |
| 3,098,104 | 7/1963 | Reifschneider | 260—609 |

OTHER REFERENCES

Reid, "Organic Chemistry of Bivalent Sulfur" (1960), volume 1, p. 128; volume 2, pages 24–25.

CHARLES B. PARKER, *Primary Examiner.*

DONALD CZAJA, *Examiner.*

J. A. KOLASCH, DELBERT R. PHILLIPS,
*Assistant Examiners.*